United States Patent Office 2,842,518
Patented July 8, 1958

2,842,518

PRODUCT PRODUCED BY POLYMERIZATION OF VINYLIDENE CHLORIDE - ACRYLONITRILE MIXTURES ONTO POLYCHLOROPRENE

Howard H. Irvin, Gary, Ind., assignor, by mesne assignments, to Borg-Warner Corporation, Chicago, Ill., a corporation of Illinois No Drawing. Application September 13, 1954
Serial No. 455,753

2 Claims. (Cl. 260—45.5)

The invention relates to nonflammable, high impact graft polymeric products.

An object of this invention is to provide a graft polymer of high impact strength having the advantage of being nonflammable.

In accordance with one embodiment of this invention an emulsion of polychloroprene is first prepared. To this emulsion are added monomers of acrylonitrile and vinylidene chloride in a proportion of about 40–80% combined acrylonitrile and vinylidene chloride by dry weight giving a polychloroprene content of 20–60% by weight. The acrylonitrile is preferably used in about 20–25% by weight but suitably may be as low as 10% with a consequent, but in some cases not objectionable, decrease in toughness of the resulting product. The vinylidene chloride is present in about 30–70% by weight. In order to have a smoother milling product styrene may also be added up to about 20% by weight of the composition.

The polychloroprene may be replaced by other polyhaloprenes, such as polybromoprene. Likewise the vinylidene chloride may be replaced by dichloroethylene. Other vinyl cyanide compounds may be used in place of the acrylonitrile, such as methacrylonitrile. Likewise, the styrene may be replaced by alkyl vinyl benzenes having the alkyl substituted either in the ring or side chain such as vinyl toluene alpha methyl styrene, alpha methyl paramethyl styrene, or the like. Other ingredients may be added such as, for example, minor proportions of butadiene monomer may be used instead of the styrene.

The composition containing the polyhaloprene and the monomers above mentioned is heated to a temperature substantially above 20° C., but below the decomposition temperature of the polymer, viz., 50° C. to 100° C., preferably in the presence of polymerization catalysts, whereupon the acrylonitrile, vinylidene chloride, styrene and polyhaloprene co-act to form the nonflammable high impact graft polymeric product of this invention.

Particularly satisfactory results are obtained by carrying out the major portion of the polymerization and copolymerization reactions at between 40° C. and 85° C. At lower temperatures the product becomes more rubbery than is desirable for many purposes, and at higher temperatures the thermoplasticity decreases to an extent which is generally objectionable. The reaction is exothermic and the minor latter portion of the reaction can proceed at high temperatures without making the product unsatisfactory. However, for uniformity it is desirable to carry out substantially all of the reaction at between 40° C. to 85° C.

The following examples are given to illustrate the invention:

*Example I*

To 30 parts of polychloroprene in the form of a 35% latex was added the following materials, parts by weight:

3.0 parts rosin soap
3.5 parts sodium pyrophosphate
0.15 part sodium hydroxide
0.15 part "Daxad" (sodium salt of condensed alkyl naphthalene sulfonic acid)
1.01 parts dextrose
0.05 part ferrous sulfate
146.5 parts distilled water The above composition was transferred to a glass pressure vessel and there was added to it 20 parts of styrene, 25 parts of acrylonitrile, 25 parts of vinylidene chloride, 1.0 part of a stabilizer consisting of cadmium salt of a fatty acid and 0.75 part of cumene hydroperoxide. The vessel was sealed and then tumbled in a constant temperature water bath at 65° C. for six hours.

To the resulting latex was added an antioxidant dispersion containing 1.0 parts of di-tertiary butyl para cresol and 0.5 part of Agerite Stalite (heptylated diphenylamine). The product was precipitated by the addition of 4.0 parts of sulfuric acid and 10.0 parts of salt and, after heating the slurry to 90° C., separated by filtering and washing. The yield after drying to constant weight was 89%.

The polymer was formed into a sheet by milling on a laboratory rubber mill with the rolls heated to 320° F. It was very tough but quite plastic when hot and could be molded readily into smooth sheets for testing. The following test results were obtained:

Tensile strength_____ 3891 p. s. i.
Elongation_____ 153%.
Shore D hardness_____ 75.
Softening point_____ 78° C.
Burning rate_____ Self-extinguishing.

*Example II*

A run similar to that of Example I was made except that GR–S 2000 latex (a styrene-butadiene copolymer containing 46% styrene) was substituted for the chloroprene latex. This product was quite similar except that it was not self-extinguishing after removal from a flame.

*Example III*

In this experiment the same formula as that of Example I was used except that the chloroprene was increased from 30% to 40% and the styrene reduced from 20% to 10%.

The increased content of rubbery polymer resulted in a lower softening point—62.5° C.—and a lower Shore D hardness—67. Otherwise, the product was similar to that of Example I in being flame-proof, tough, and moldable.

*Example IV*

This run was similar to that of the preceding except that the chloroprene proportion was increased to 50% and the styrene omitted. This product was much less plastic and could not be formed into a smooth sheet by milling.

*Examples V–VIII*

A series was run using the same basic formula but with the following proportions of rubbery polymer and monomers:

|  | V | VI | VII | VIII |
|---|---|---|---|---|
| Polychloroprene | 50 | 50 | 40 | 40 |
| Styrene | 10 | 10 | 10 | 10 |
| Acrylonitrile | 25 | 15 | 20 | 15 |
| Vinylidene chloride | 15 | 25 | 30 | 35 |

The products were characterized by high resistance to impact and flame-proofness. Plasticity increased as the vinylidene chloride content was increased, the product of run VII forming the smoothest sheets on milling and molding.

The products of the foregoing examples can be modified to give harder and non-thermoplastic products by adding curing agents such as sulfur or heat reactive phenolic resins and the like to the final latex prior to coagulation. Preferably the milling step is omitted, or care is taken that the temperature and time of milling is low in order to prevent reaction on the mill, and then the curing is carried out during the molding. The time and temperature for curing with sulfur and phenolic resin can be that normally used for curing such materials with rubber. However, as an example, satisfactory results are obtained by incorporating 2 to 3% of sulfur in the latex on the basis of the total solids with 1% by weight of an accelerator such as tetramethyl thiuram disulphide, mercaptobenzothiazole or the like, and 5% of zinc oxide. The latex containing this composition is coagulated, dried and molded under heat of 320° F. for about 15 minutes. This produces a well cured sheet as a result of the reaction of the sulfur with residual unreacted groups of the graft polymer. In place of the sulfur similar results, but with increased hardness, are obtained by incorporating 10% to 30% by weight of a heat reactive phenolic resin, such as a partially cured phenol formaldehyde resin in the latex, and then coagulating, drying, molding, and curing as with the sulfur.

While I have described certain preferred embodiments of my invention, many modifications may be made in the same without departing from the spirit of the invention; and I do not wish to be limited to the detailed examples, formulas and proportions of ingredients herein set forth, but desire to avail myself of all changes within the scope of the appended claims.

What I claim as new and desire to secure by Letters Patent is:

1. A nonflammable, high impact product obtained by the interaction, under polymerizing conditions, of an aqueous polychloroprene latex, vinylidene chloride and acrylonitrile, the polychloroprene on the dry basis comprising 20–60%, the vinylidene chloride 30–70%, and the acrylonitrile 10–25% of the total weight on the dry basis of these three reactants.

2. A nonflammable, high impact product obtained by the interaction, under polymerizing conditions, of an aqueous polychloroprene latex, vinylidene chloride, acrylonitrile and styrene, the polychloroprene on the dry basis comprising 20–60%, the vinylidene chloride 30–70%, the acrylonitrile 20–25%, and the styrene up to about 20% of the total weight on the dry basis of these four reactants, the styrene being employed in a sufficient amount up to the maximum figure named to give substantially improved millability of the resulting product.

References Cited in the file of this patent

UNITED STATES PATENTS

| | | |
|---|---|---|
| 2,547,605 | Signer et al. | Apr. 3, 1951 |
| 2,666,025 | Nozaki | Jan. 12, 1954 |

FOREIGN PATENTS

| | | |
|---|---|---|
| 679,562 | Great Britain | Sept. 17, 1952 |
| 690,937 | Great Britain | Apr. 29, 1953 |